(12) United States Patent
Grieser-Schmitz et al.

(10) Patent No.: US 8,986,801 B2
(45) Date of Patent: Mar. 24, 2015

(54) POLYURETHANE HAVING IMPROVED INSULATING PROPERTIES

(75) Inventors: Christof Grieser-Schmitz, Osnabrueck (DE); Carsten Ellersiek, Lengerich (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/357,822

(22) Filed: Jan. 25, 2012

(65) Prior Publication Data
US 2012/0196066 A1 Aug. 2, 2012

Related U.S. Application Data

(60) Provisional application No. 61/436,655, filed on Jan. 27, 2011.

(51) Int. Cl.
*B29D 22/00* (2006.01)
*B29D 23/00* (2006.01)
*B32B 1/08* (2006.01)
(Continued)

(52) U.S. Cl.
CPC ................ *B32B 1/08* (2013.01); *C09D 175/04* (2013.01); *B29D 22/00* (2013.01); *B29D 23/00* (2013.01); *B65D 39/00* (2013.01); *B29C 44/12* (2013.01); *B32B 5/20* (2013.01); *B32B 15/046* (2013.01); *B32B 15/18* (2013.01); *B32B 27/065* (2013.01); *B32B 27/32* (2013.01); *B32B 2250/03* (2013.01); *B32B 2266/0278* (2013.01); *B32B 2305/022* (2013.01); *B32B 2307/304* (2013.01); *B32B 2307/722* (2013.01); *B32B 2597/00* (2013.01); *F16L 59/143* (2013.01); *C08G 18/4829* (2013.01); *C08G 18/7664* (2013.01); *C08G 18/48* (2013.01); *C08L 75/04* (2013.01); *C08G 2101/0025* (2013.01); *C08G 2101/0058* (2013.01)
USPC ..... 428/36.5; 428/36.9; 428/36.91; 428/35.7; 428/76; 521/164; 521/170

(58) Field of Classification Search
CPC ........... F16L 59/14; C08L 75/04; B32B 5/18; B32B 1/08; C09D 175/04; B29D 22/00; B29D 23/00; B65D 39/00
USPC ..................... 428/36.9, 36.91, 36.5, 35.7, 76; 521/164, 170
See application file for complete search history.

(56) References Cited

U.S. PATENT DOCUMENTS

| 8,231,952 B2 | 7/2012 | Grieser-Schmitz et al. |
| 2011/0175346 A1 | 7/2011 | Grieser-Schmitz et al. |

FOREIGN PATENT DOCUMENTS

| CA | 2154045 A1 * | 1/1996 | ............ C08G 18/79 |
| CN | 101012332 A | 8/2007 | |

(Continued)

OTHER PUBLICATIONS

U.S. Appl. No. 13/456,688, filed Apr. 26, 2012, Mohmeyer, et al.
(Continued)

*Primary Examiner* — Michael C Miggins
(74) *Attorney, Agent, or Firm* — Oblon, McClelland, Maier & Neustadt, L.L.P.

(57) ABSTRACT

The present invention relates to a rigid polyurethane foam in which rigid polyurethane foam constituents are embedded in a polyurethane matrix, articles which are enveloped by such a foam for insulation and corresponding production processes.

20 Claims, 1 Drawing Sheet

(51) Int. Cl.

| | | |
|---|---|---|
| *B65D 39/00* | (2006.01) | |
| *B29C 44/12* | (2006.01) | |
| *B32B 5/20* | (2006.01) | |
| *B32B 15/04* | (2006.01) | |
| *B32B 15/18* | (2006.01) | |
| *B32B 27/06* | (2006.01) | |
| *B32B 27/32* | (2006.01) | |
| *F16L 59/14* | (2006.01) | |
| *C08G 18/48* | (2006.01) | |
| *C08G 18/76* | (2006.01) | |
| *C08L 75/04* | (2006.01) | |
| *C09D 175/04* | (2006.01) | |
| *C08G 101/00* | (2006.01) | |

(56) References Cited

FOREIGN PATENT DOCUMENTS

| DE | 41 32 282 A1 | 4/1992 |
|---|---|---|
| DE | 43 22 601 A1 | 1/1995 |
| DE | 197 42 012 A1 | 3/1999 |
| EP | 0 693 526 A1 | 1/1996 |
| EP | 0 865 893 A2 | 9/1998 |
| EP | 0 960 723 A2 | 12/1999 |
| EP | 1 428 848 A1 | 6/2004 |
| EP | 1 552 915 A2 | 7/2005 |
| EP | 1 777 051 A1 | 4/2007 |
| EP | 1 777 242 A1 | 4/2007 |
| EP | 1 777 244 A1 | 4/2007 |
| GB | 2 053 944 A | 2/1981 |
| GB | 2 298 424 A | 9/1996 |

OTHER PUBLICATIONS

U.S. Appl. No. 13/423,503, filed Mar. 19, 2012, Tomasi, et al.
International Search Report issued Aug. 7, 2012 in German Patent Application No. PCT/EP2012/051128 (with English translation of Category of Cited Documents).
U.S. Appl. No. 13/684,976, filed Nov. 26, 2012, Ellersiek.
U.S. Appl. No. 13/923,959, filed Jun. 21, 2013, Grieser-Schmitz et al.
Combined Office Action and Search Report issued Jul. 18, 2014 in Chinese Patent Application No. 201280015476.1 (with English translation).

* cited by examiner

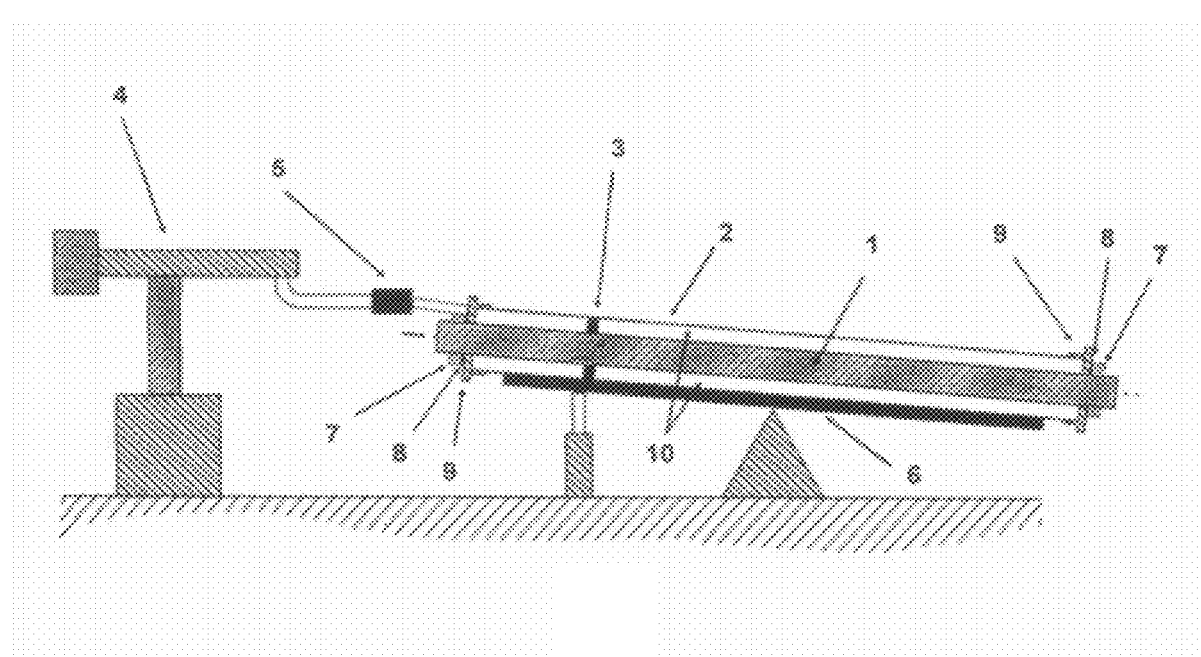

POLYURETHANE HAVING IMPROVED INSULATING PROPERTIES

The invention relates to a polyurethane having improved insulating properties, which is preferably used in the insulation of hollow bodies, in particular in the insulation of pipe systems.

Hollow spaces are frequently filled with foams, preferably polyurethane foams, which have excellent thermal conductivity values in order to improve the insulating properties of the hollow space in this way.

A liquid reaction mixture is introduced into the hollow spaces by means of a polyurethane metering machine, and this mixture has to become distributed in still liquid form in the hollow space before the reaction commences. Once the reaction commences, further distribution due to flow of the foam which steadily increases in viscosity takes place until the material has fully reacted. In order to insulate, in particular, large hollow spaces, the reaction profile of the reacting polyurethane foam has to be very slow. This is based on the fact that the foam has to achieve good predistribution in the hollow space in the liquid, i.e. still unreacted, state. Furthermore, in the case of large hollow space dimensions, sufficient time has to be available for the polyurethane material required to be introduced into the hollow space within the cream time. Here too, a long cream time is required. The cream time is the time which elapses before the liquid reaction mixture begins to foam. However, long cream times have been found to lead to relatively large cell diameters in the foam system produced in this way since many of the cells formed join to produce larger units when the reacting reaction mixture does not fix these by means of an increase in viscosity and reaching of the fiber time. Since the radiative thermal conductivity is a function of the square of the radius of the cells in the foam, a foam having a long cream time experiences a significant increase in the thermal conductivity compared to a foam having a short cream time, and is then once again not suitable for filling large hollow spaces. However, for economic and ecological reasons, a minimal thermal conductivity of the foam and thus a maximum energy saving is desired in the insulation of hollow spaces.

This question is also particularly important in the case of pipe systems which are utilized for the transport of media which are hot or cold relative to the ambient temperature, particularly when they have a life of more than 30 years. Such pipe systems, in particular for district heating, are frequently made up of individual pipe segments. Pipe lengths of, for example, 6 m, 12 m or 16 m are normally used for this purpose. Longer lengths required are specially manufactured or cut to size from existing manufactured ware. Pipes insulated by polyurethane foams are known in the prior art and are described, for example, in EP-A-865 893 and DE-A-197 42 012. The individual pipe segments are welded together and after-insulated in the region of the welding seam using the existing muff technology. The time taken to produce a muff connection is a limited time factor in laying of the pipes. In addition, it is frequently a weak point in the insulating properties since it is usually produced under time pressure and weathering influences such as temperature, soiling and moisture on the building site. Furthermore, the number of muff connections represents a large cost factor in the installation of pipe systems.

It is therefore desirable in the pipe-processing industry to install the fewest possible muff connections per unit length of a line and at the same time to optimize the quality, in particular the thermal conductivity. This is achieved by use of relatively long individual pipe segments, but the production of these involves more demanding requirements and frequently leads to technical problems. The larger the annular gap to be filled with foam between the outer and inner pipe, the more liquid reaction mixture has to be introduced and the slower does the reaction have to take place, with the abovementioned disadvantages.

In providing the pipes with foam, a clear distinction has to be made between two terms. Firstly, in stage 1, reference is made to "predistribution" of the not yet reacting reaction mixture, and subsequently, in stage 2, to "flowing" of the foaming reaction mixture.

Owing to the required technical properties, for example in respect of the compressive strength, polyurethane systems comprising high-functionality polyols having a correspondingly high viscosity are used in the prior art. This results in polyol mixtures having high overall viscosities which, although they display good flow in stage 2, give poor predistribution in stage 1.

A uniform foam density distribution of the foam is important for the quality of the pipes, but this is not sufficiently good when the polyurethane systems known hitherto are used. A relatively low foam density is usually obtained at the ends and a higher foam density is obtained in the middle of the pipe. The longer the pipe, the higher, for production reasons, the required overall foam density of the foam in the annular gap Furthermore, the flow of the foam is limited in systems of the prior art, so that, after the fiber time has been reached, the foam rolling forward leads to poor properties (low compressive strength, high water absorption, poor thermal conductivity, etc). This foam structure generally occurs at the pipe ends and is referred to as "push zone".

It is therefore an object of the invention to provide a reaction mixture for large hollow spaces which quickly becomes uniformly distributed in these hollow spaces, has a long cream time and nevertheless has a very small cell diameter in the resulting rigid foam in order to have, in particular, good insulating properties, also cures quickly and has good flow properties. A further object of the invention is to provide a polyurethane system which can be used advantageously in the production of insulated pipes and there leads to a polyurethane foam having a uniform foam density distribution. Furthermore, the occurrence of a "push zone" should be avoided.

This object is achieved by introducing polyurethane foam constituents into a low-viscosity polyurethane system, also referred to as reaction mixture, and allowing this mixture to cure, preferably in a mold, particularly preferably in a hollow space.

The invention thus provides the mixture described, the rigid polyurethane foam formed therefrom, articles produced using the rigid polyurethane foam and the process for producing shaped articles using this mixture or filling hollow bodies and also the use of the starting materials for a corresponding process.

FIG. 1 illustrates a preferred process for producing a thermally insulating pipe. In the FIGURE, the reference numerals have the following meanings:
1 Pipe for a medium, i.e. pipe for conveying liquids and/or gases
2 Outer pipe
3 Spacer
4 Metering machine for low-viscosity polyurethane system
5 Mixing head
6 Tiltable foaming table
7 Clamp
8 Seal
9 End cap with venting holes 10 Annular gap with mixture of low-viscosity polyurethane system and rigid polyurethane foam constituents which cure to form the rigid polyurethane foam.

In this preferred process, the pipe (1) for a medium is provided with spacers (3) which serve to center the inner pipe, pipe 1 for a medium, in the outer pipe (2). The pipe (1) for a medium is pushed into the outer pipe (2) so that a concentric annular gap (10) is obtained between the two pipes. This annular gap is filled with a mixture which is composed of a low-viscosity polyurethane system and rigid polyurethane foam constituents and cures to form the rigid polyurethane foam in such a way that the rigid polyurethane foam constituents are distributed uniformly in a polyurethane matrix formed from the low-viscosity polyurethane system. The mixture is produced in the mixing head (5) where the starting materials for the polyurethane matrix (=low-viscosity polyurethane system) are mixed uniformly with the polyurethane foam constituents.

Production of the Polyurethane Foam Constituents

The polyurethane foam constituents are preferably produced on continuously operating double belt units. For this purpose, the polyol component and isocyanate component are metered by means of a high-pressure machine and mixed in a mixing head. Catalysts and/or blowing agents are preferably introduced beforehand into the polyol mixture by means of separate pumps. The mixture of the starting components is applied continuously to a lower covering layer. The lower covering layer together with the applied material and the upper covering layer run into the double belt. Here, the starting components foam and cure. After leaving the double bond, the continuous strip of foam is comminuted to the desired dimensions, preferably by means of mechanical comminution. Mechanical comminution is preferably carried out using rollers, mills, shredders or similar devices. In other preferred embodiments, comminution is carried out by means of compressed air or a jet of water. In further preferred embodiments, the polyurethane foam constituents are produced thermally or by means of high-energy radiation, preferably using laser beams.

In further preferred embodiments, a thin polyurethane strip is extruded as foam which is then comminuted to give the desired small polyurethane foam constituents. Here too, the abovementioned comminution processes are preferably employed.

The starting components are preferably mixed at a temperature of from 15° C. to 35° C., more preferably from 20° C. to 30° C. The mixed starting components are preferably poured by means of high- or low-pressure metering machines into closed support tools.

In other embodiments, polyurethane foam constituents are produced from work-up and reuse (recycling) of suitable foams. Suitable scrap is obtained, in particular, in the continuous manufacture of pipes or sandwich panels.

The rigid polyurethane foams of the invention are preferably used for thermal insulation, more preferably of hollow spaces, preferably of hollow spaces in refrigeration appliances, containers, pipes or buildings, particularly preferably pipes which are used for the transport of hot and/or cold media, very particularly preferably district heating pipes, particularly preferably in accordance with EN 253:2009. The rigid polyurethane foam is likewise preferably used for the filling of muffs which, when two insulated pipes for a medium are connected, at least insulate the connection and also protect it against mechanical damage.

Polyurethane foams, in particular rigid polyurethane foams, have been known for a long time and are widely described in the literature. They are usually produced by reacting organic polyisocyanates (a1) with compounds having at least two hydrogen atoms which are reactive toward isocyanate groups (b1), hereinafter also referred to as compound (b1) in the interests of simplicity, preferably polyols.

In preferred embodiments, auxiliaries and/or additives are added to the polyurethane foams.

As organic polyisocyanates (a1), preference is given to using aromatic polyfunctional isocyanates.

Preferred isocyanates are tolylene 2,4- and 2,6-diisocyanate (TDI) and the corresponding isomer mixtures, diphenylmethane 4,4'-, 2,4'- and 2,2'-diisocyanate (MDI) and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates.

The organic diisocyanates and polyisocyanates can be used individually or in the form of mixtures.

Preference is likewise given to using polyfunctional isocyanates, i.e. products which are obtained by chemical reaction of organic diisocyanates and/or polyisocyanates. Examples which may be mentioned are preferably diisocyanates and/or polyisocyanates comprising isocyanurate and/or urethane groups. In preferred embodiments, modified polyisocyanates are mixed with one another or with unmodified organic polyisocyanates such as diphenylmethane 2,4'-, 4,4'-diisocyanate crude MDI, tolylene 2,4- and/or 2,6-diisocyanate.

In one of the preferred embodiments, reaction products of polyfunctional isocyanates with polyfunctional polyols and mixtures thereof with other diisocyanates and polyisocyanates are also used.

As organic polyisocyanate (a1), particular preference is given to crude MDI having an NCO content of from 29% by weight to 33% by weight and a viscosity at 25° C. in the range from 0.15 Pa*s to 1 Pa*s, determined in accordance with DIN 53019-1:2009 (9.2.5-cylindrical rotational viscometer).

As compounds (b1), use is made, in particular, of polyether alcohols and/or polyester alcohols having OH numbers in the range from 0.1 to 1.2 g KOH/g.

The polyester alcohols are usually prepared by condensation of polyfunctional alcohols, preferably diols, having from 2 to 12 carbon atoms, preferably from 2 to 6 carbon atoms, with polyfunctional carboxylic acids having from 2 to 12 carbon atoms, preferably succinic acid, glutaric acid, adipic acid, suberic acid, azelaic acid, sebacic acid, decanedicarboxylic acid, maleic acid, fumaric acid and more preferably phthalic acid, isophthalic acid, terephthalic acid and the isomeric naphthalenedicarboxylic acids.

The compound (b1) having at least two hydrogen atoms which are reactive toward isocyanate preferably has a functionality in the range from 2 to 8, in particular from 3 to 7.

Preference is given to using polyether polyols which are prepared by known methods, for example by anionic polymerization of alkylene oxides in the presence of catalysts, preferably alkali metal hydroxides.

As alkylene oxides, preference is given to using ethylene oxide and/or propylene oxide, more preferably pure 1,2-propylene oxide.

As starter molecules for the compound (b1), preference is given to using compounds having at least 3, preferably from 4 to 8, hydroxyl groups or at least two primary amino groups per molecule.

The starter molecules having at least 3, preferably from 4 to 8, hydroxyl groups in the molecule are preferably selected from the following group: trimethylolpropane, glycerol, pentaerythritol, sugar compounds, preferably glucose, sorbitol, mannitol and/or sucrose, polyhydric phenols, resols, oligomeric condensation products of phenol and formaldehyde, Mannich condensates of phenols, formaldehyde and dialkanolamines and also melamine.

As starter molecules having at least two primary amino groups in the molecule, preference is given to using aromatic diamines and/or polyamines, preferably phenylenediamines, 2,3-, 2,4-, 3,4- and 2,6-tolylenediamine and 4,4'-, 2,4'- and 2,2'-diaminodiphenylmethane, and also aliphatic diamines and polyamines, such as ethylenediamine.

The polyether polyols have a functionality of preferably from 3 to 8 and hydroxyl numbers of preferably from 0.1 g KOH/g to 1.2 g KOH/g and in particular from 0.24 g KOH/g to 0.57 g KOH/g.

The compounds having at least two hydrogen atoms which are reactive toward isocyanate (b) also include the chain extenders and/or crosslinkers which may optionally be concomitantly used. Preference is given to using bifunctional chain extenders, trifunctional and higher-functional crosslinkers or optionally mixtures thereof for modifying the mechanical properties.

As chain extenders and/or crosslinkers, preference is given to using alkanolamines and in particular diols and/or triols having number average molecular weights of less than 0.4 kmol, preferably from 0.06 kmol to 0.3 kmol.

Chain extenders, crosslinkers or mixtures thereof are advantageously used in an amount of from 1% by weight to 20% by weight, preferably from 2% by weight to 5% by weight, based on the compound (b1), preferably the polyol.

Further information on the polyether alcohols and polyester alcohols used and also their preparation may be found, for example, in Kunststoffhandbuch, volume 7 "Polyurethane", edited by Günter Oertel, Carl-Hanser-Verlag Munich, 3rd edition, 1993.

The polyurethane foams are preferably produced in the presence of blowing agents, catalysts and cell stabilizers and, if necessary, further auxiliaries and/or additives.

A preferred blowing agent is water which reacts with isocyanate groups to eliminate carbon dioxide. In other preferred embodiments, physical blowing agents are used in combination with or in place of water. These are compounds which are inert toward the starting components, are usually liquid at room temperature and vaporize under the conditions of the urethane reaction. The boiling point of the physical blowing agents is preferably below 51° C. The physical blowing agents also include compounds which are gaseous at room temperature and are introduced under superatmospheric pressure into the starting components or dissolved therein; some preferred representatives are carbon dioxide, low-boiling alkanes and fluoroalkanes.

The physical blowing agents are preferably selected from the group consisting of alkanes and/or cycloalkanes having at least 4 carbon atoms, dialkyl ethers, esters, ketones, acetals, fluoroalkanes having from 1 to 8 carbon atoms and tetraalkylsilanes having from 1 to 3 carbon atoms in the alkyl chain, in particular tetramethylsilane.

Further preferred physical blowing agents are propane, n-butane, isobutane and cyclobutane, n-pentane, isopentane and cyclopentane, cyclohexane, dimethyl ether, methyl ethyl ether, methyl butyl ether, methyl formate, acetone and also fluoroalkanes which are degraded in the troposphere and therefore to not harm the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane and heptafluoropropane.

The physical blowing agents mentioned can be used either alone or in any combinations with one another.

Catalysts used are in particular compounds which strongly accelerate the reaction of the isocyanate groups with the compound (b1) which is reactive toward isocyanate groups.

Such catalysts are strongly basic amines, e.g. secondary aliphatic amines, imidazoles, amidines and also alkanolamines.

In some preferred embodiments, isocyanurate groups are built into the polyurethane foam. Specific isocyanurate catalysts are required for this purpose. As isocyanurate catalysts, preference is given to using, for example, metal carboxylates, in particular potassium acetate and solutions thereof.

The catalysts are, dependent on requirements, used either alone or in any mixtures with one another.

In preferred embodiments of the production of the polyurethane foams, auxiliaries and/or additives are used. These include, for example, surface-active substances, foam stabilizers, cell regulators, fillers, flame retardants, nucleating agents, oxidation inhibitors, stabilizers, lubricants and mold release agents, dyes and pigments.

Further details regarding the customary auxiliaries and additives may be found in the specialist literature, see, for example, Kunststoffhandbuch, volume VII, edited by Vieweg and Höchtlen, Carl Hanser Verlag, Munich 1966 (pages 103-113).

As flame retardants, preference is given to using organic phosphoric esters and/or phosphonic esters. Preference is given to using compounds which are not reactive toward isocyanate groups. Chlorine-comprising phosphoric esters are also among the preferred compounds.

Preferred representatives of this group of flame retardants are triethyl phosphate, diphenyl cresyl phosphate, tris(chloropropyl)phosphate and diethyl ethanephosphonate.

Bromine-comprising flame retardants are also used in other preferred embodiments. As bromine-comprising flame retardants, preference is given to using compounds having groups which are reactive toward the isocyanate group. Such compounds are preferably esters of tetrabromophthalic acid with aliphatic diols and alkoxylation products of dibromobutenediol.

Compounds derived from brominated neopentyl compounds comprising OH groups are also preferably employed.

To produce the rigid polyurethane foams, the organic polyisocyanates (a1) and the compound (b1) are reacted in such amounts that the isocyanate index is in the range from 100 to 220, preferably from 105 to 180, particularly preferably from 110 to 160. The isocyanate index is calculated. It is the ratio of the number of isocyanate groups available for the reaction to the number of hydroxyl groups available. This ratio is then multiplied by 100. In the case of values greater than 100, an excess of isocyanate is present.

The rigid polyurethane foams are preferably produced either batchwise or continuously by means of known mixing apparatuses.

The rigid polyurethane foams of the invention are preferably produced by the two-component process. In this process, the compounds having at least two hydrogen atoms which are reactive toward isocyanate groups (b), optionally together with at least one flame retardant, at least one blowing agent, optionally at least one catalyst and optionally further auxiliaries and/or additives are mixed to form the polyol component and this is reacted with the at least one polyisocyanate or mixtures of the polyisocyanates and optionally blowing agents, also referred to as isocyanate component.

Polyol component and isocyanate component are also referred to as starting components. These starting components are usually mixed at a temperature of from 15° C. to 35° C., preferably from 20° C. to 30° C. The reaction mixture can be poured by means of high- or low-pressure metering machines into closed support tools. Sandwich elements, for example, are produced batchwise by means of this technology.

In addition, the reaction mixture can also be poured or sprayed freely onto surfaces or into hollow spaces. Roofs and complicated containers can be insulated in situ by this process.

Continuous mixing of the isocyanate component with the polyol component to produce sandwich elements or insulation elements on double belt units is also a preferred embodiment. In the case of this technology, the catalysts and the blowing agents are preferably metered by means of further metering pumps into the polyol component. Here, the original components can be divided up into up to 8 individual components. The foaming formulations can be simply converted, on the basis of the two-component process, to the processing of multiple component systems.

The density of the rigid polyurethane foam constituents is preferably from 10 kg/m$^3$ to 400 kg/m$^3$, preferably from 20 kg/m$^3$ to 200 kg/m$^3$, more preferably from 30 kg/m$^3$ to 80 kg/m$^3$, very particularly preferably from 30 kg/m$^3$ to 70 kg/m$^3$.

The advantage is that the foams used have a lower foam density and/or a smaller cell diameter than the matrix. Both lead to a lower thermal conductivity of the total foam in the hollow space.

The foam cells in the rigid polyurethane foam constituents preferably have an average cell diameter in the range from 0.1 mm to 0.5 mm, more preferably from 0.11 mm to 0.3 mm, particularly preferably from 0.12 mm to 0.2 mm and very particularly preferably from 0.12 mm to 0.18 mm. The average cell diameter is determined in accordance with EN 489: 2009 (according to section 5.4.5.1).

At least 80% of the foam cells per unit volume more preferably have the stated cell diameter, even more preferably at least 90% and very particularly preferably at least 95%.

The maximum dimension of the polyurethane foam constituents is in the range from 0.06 cm to 1 cm, more preferably from 0.1 cm to 0.8 cm, particularly preferably from 0.1 cm to 0.5 cm.

In a preferred embodiment, polyurethane foam constituents have any shape as they are formed from larger foams in comminution operations. In another preferred embodiment, the polyurethane foam constituents have rounded corners and are preferably egg-shaped and/or round.

The polyurethane matrix is produced by reaction of at least one isocyanate component (a2) with at least one compound (b2) which is reactive toward isocyanate, preferably a polyol, optionally using at least one catalyst (c2) and/or optionally at least one chemical blowing agent (d2). The mixture from which the polyurethane matrix is produced is also referred to as reaction mixture or low-viscosity polyurethane system.

The compound (b2), optionally comprising at least one catalyst (c2) and/or at least one chemical blowing agent (d2), preferably has a viscosity of less than 2 Pa*s and more than 0.4 Pa*s, preferably less than 1.8 Pa*s and more than 0.5 Pa*s and particularly preferably less than 1.5 Pa*s and more than 0.5 Pa*s, measured in accordance with DIN 53019-1:2008 (9.2.5-cylindrical rotational viscometer) at 20° C.

If a blowing agent is added in the production of the rigid foam, the viscosities indicated apply to the compound (b2) and also to those of the reaction mixture, in each case based on the viscosity with the blowing agent.

The reaction mixture preferably has a viscosity in the unreacted state at 20° C. in the range from 0.3 Pa*s to 1.5 Pa*s, preferably from 0.35 Pa*s to 1.2 Pa*s, particularly preferably from 0.4 Pa*s to 1.0 Pa*s and very particularly preferably from 0.4 Pa*s to 0.8 Pa*s, determined in accordance with DIN 53019-1:2008 (9.2.5-cylindrical rotational viscometer). The viscosity of the polyurethane system is measured before addition of the polyurethane foam constituents when all constituents of the reaction mixture have been mixed. If a physical blowing agent is used, this has to be comprised before the viscosity measurement.

As isocyanate component (a2), use is made of the customary aliphatic, cycloaliphatic and in particular aromatic diisocyanates and/or polyisocyanates. Preference is given to using tolylene diisocyanate (TDI), diphenylmethane diisocyanate (MDI) and in particular mixtures of diphenylmethane diisocyanate and polyphenylenepolymethylene polyisocyanates (crude MDI). The isocyanates can also be modified, for example by incorporation of uretdione, carbamate, isocyanurate, carbodiimide, allophanate and in particular urethane groups.

The isocyanate component (a2) can also be used in the form of polyisocyanate prepolymers. These prepolymers are known in the prior art. They are prepared in a known manner by reacting above-described polyisocyanates (a2), for example at temperatures of about 80° C., with compounds having hydrogen atoms which are reactive isocyanates (b2), preferably with polyols, to form polyisocyanate prepolymers. The polyol/polyisocyanate ratio is generally selected so that the NCO content of the prepolymer is from 8% by weight to 25% by weight, preferably from 10% by weight to 22% by weight, particularly preferably from 13% by weight to 20% by weight.

The polyurethane matrix is preferably produced using crude MDI.

In a preferred embodiment, the isocyanate component (a2) is selected so that it has a viscosity of less than 1300 mPas, preferably from 100 mPas to 800 mPas, particularly preferably from 120 mPas to 600 mPas, in particular from 180 mPas to 350 mPas, measured in accordance with DIN 53019-1: 2008 (9.2.5-cylinder rotational viscometer) at 20° C.

In the prior art, it may be customary to incorporate isocyanurate groups into the polyisocyanate. Catalysts which preferentially form isocyanurate groups, for example alkali metal salts either alone or in combination with tertiary amines, are used for this purpose. Isocyanurate formation leads to flame-resistant polyisocyanurate (PIR) foams which are preferably used in industrial rigid foam, for example in building and construction as insulation board or sandwich elements.

For the purposes of the present invention, the polyurethane systems and polyurethane foams according to the invention are preferably essentially free of isocyanurate groups. The ratio of isocyanurate group to urethane group in the foam is preferably less than 1:10, particularly preferably less than 1:100. In particular, essentially no isocyanurate groups are present in the rigid polyurethane foam of the invention.

In a further preferred embodiment, a physical blowing agent is added to the compound (b2). The addition of a physical blowing agent leads to a significant decrease in the viscosity.

Possible compounds (b2) are generally compounds having at least two groups which are reactive toward isocyanate, i.e. having at least two hydrogen atoms which are reactive toward isocyanate groups. Examples are compounds having OH groups, SH groups, NH groups and/or NH$_2$ groups.

As polyols, preference is given to using compounds based on polyesters or polyethers. The functionality of the polyetherols and/or polyesterols is preferably from 1.9 to 8, more preferably from 2.4 to 7, particularly preferably from 2.9 to 6.

The compound (b2) preferably has a hydroxyl number in the range from 200 mg KOH/g to 1000 mg KOH/g, preferably from 250 mg KOH/g to 800 mg KOH/g, particularly preferably from 300 mg KOH/g to 600 mg KOH/g, very particularly preferably from 300 mg KOH/g to 500 mg KOH/g.

Compound (b2) preferably comprises polyether polyols prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one starter molecule comprising from 2 to 8, preferably from 3 to 8, reactive hydrogen atoms in bound form or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures.

Possible starter molecules are alcohols such as glycerol, trimethyloipropane (TMP), pentaerythritol, sucrose, sorbitol and also amines such as methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine and the like.

Further compounds which can be used as starter molecules are condensation products of formaldehyde. phenol and diethanolamine or ethanolamine, formaldehyde, alkylphenols and diethanolamine or ethanolamine, formaldehyde, bisphenol A and diethanolamine or ethanolamine, formaldehyde, aniline and diethanolamine or ethanolamine, formaldehyde, cresol and diethanolamine or ethanolamine, formaldehyde, toluidine and diethanolamine or ethanolamine and also formaldehyde, toluenediamine (TDA) and diethanolamine or ethanolamine and the like.

Preference is given to using sucrose, glycerol and TDA as starter molecule.

The polyol mixture can optionally comprise, as constituent (c2), catalysts which accelerate the PU and/or PIR reaction. Catalysts (c2) used are usually compounds which accelerate the reaction of the hydroxyl-comprising compounds of compound (b2) with the isocyanate groups.

Possible catalysts are preferably organic tin compounds such as tin(II) salts of organic carboxylic acids and/or basic amine compounds, preferably tertiary amines such as triethylamine and/or 1,4-diazabicyclo[2.2.2]octane and also (2-hydroxypropyl)trimethylammonium 2-ethylhexanoate (CAS number 62314-22-1), (2-hydroxypropyl)trimethylammonium formate (CAS number 62314-25-4), 2-((2-dimethylamino)ethyl)methylamino)ethanol (CAS number 2212-32-0) and/or N,N',N"-tris(dimethylaminopropyl)hexahydrotriazine (CAS number 15875-13-5), dimethylcyclohexylamine (CAS number 98-94-2).

As preferred compounds which catalyze the formation of isocyanurate structures (PIR catalysts), use is made of potassium acetate, potassium formate and/or potassium octoate, particularly preferably potassium acetate.

The catalysts are generally used in an amount of from 0.001 to 5% by weight, in particular from 0.05 to 3.0% by weight, of catalyst, based on the weight of the component (b).

In this text, the CAS number is the definitive chemical designation in case of doubt.

Compound (b2) can optionally further comprise chemical blowing agents as constituent (c3). As chemical blowing agents, preference is given to water or carboxylic acids, in particular formic acid. The chemical blowing agent is generally used in an amount of from 0.1 to 5% by weight, in particular from 1.0 to 3.0% by weight, based on the weight of the compound (b2).

As mentioned above, the compound (b2) can comprise physical blowing agents. These are compounds which are dissolved or emulsified in the starting materials for polyurethane production and vaporize under the conditions of polyurethane formation. These are, for example, hydrocarbons, halogenated hydrocarbons and other compounds, for example perfluorinated alkanes such as perfluorohexane, chlorofluorocarbons and also ethers, esters, ketones and/or acetals. These are usually used in an amount of from 1% by weight to 25% by weight, preferably from 2% by weight to 20% by weight, particularly preferably from 3% by weight to 16% by weight, based on the total weight of the component (b2) comprising the blowing agent.

The compounds having at least two reactive hydrogen atoms which are reactive toward isocyanate (b2) also include the chain extenders and/or crosslinkers which may optionally be concomitantly used. Preference is also given to using bifunctional chain extenders, trifunctional and higher-functional crosslinkers or optionally mixtures thereof for modifying the mechanical properties.

As chain extenders and/or crosslinkers, preference is given to using alkanolamines and in particular diols and/or triols having number-average molecular weights of less than 0.4 kmol, preferably from 0.06 kmol to 0.3 kmol.

Chain extenders, crosslinkers or mixtures thereof are preferably used in an amount of from 1% by weight to 20% by weight, more preferably from 2% by weight to 5% by weight, based on the compound (b1), preferably the polyol comprising the chain extenders, crosslinkers or mixtures thereof but without physical blowing agent.

The crosslinkers are generally used in an amount of from 1% by weight to 10% by weight, preferably from 2% by weight to 6% by weight, based on the total weight of the compound (b2) comprising the chain extender, crosslinker or mixtures thereof but without physical blowing agent.

In a preferred embodiment, the compound (b2) comprises, as constituent (e5), chain extenders which serve to increase the crosslinking density. For the purposes of the present invention, chain extenders are compounds which have a molecular weight of from 0.06 kg/mol to <0.4 kg/mol and have 2 hydrogen atoms which are reactive toward isocyanates. Preferred examples are butanediol, diethylene glycol, dipropylene glycol and ethylene glycol.

The chain extenders are generally used in an amount of from 2% by weight to 20% by weight, preferably from 4 to 15% by weight, based on the total weight of the compound (b2). The amount of physical blowing agent is not taken into account here.

The crosslinkers (d2) and chain extenders (e2) can be used individually or in combination in the compound (b2).

The compound (b2), preferably the at least one polyol, has a hydroxyl number of more than 70 mg KOH/g, preferably more than 100 mg KOH/g, more preferably more than 150 mg KOH/g, with the hydroxyl number preferably being less than or equal to 1000 mg KOH/g, more preferably less than 800 mg KOH/g and particularly preferably less than 600 mg KOH/g.

In the reaction of the starting materials of the polyurethane matrix, the polyisocyanates (a2) and the compound (b2), preferably polyols, are preferably reacted in such amounts that the isocyanate index of the matrix is from 90 to 250, preferably from 100 to 180, particularly preferably from 110 to 159.

In a preferred embodiment, the components of the starting materials for the polyurethane matrix are selected so that the resulting foam has a compressive strength (at a foam density of 60 kg/m$^3$) of greater than 0.25 N/mm$^2$, preferably greater than 0.3 N/mm$^2$, particularly preferably greater than 0.35 N/mm$^2$, measured in accordance with DIN 53421.

Additives (f) can optionally also be incorporated into the isocyanate (a1) and/or (a2) and/or the compound (b1) and/or (b2). For the purposes of the present invention, additives (f) are the customary auxiliaries and additives known in the prior art, but without physical blowing agents. Mention may be made by way of example of surface-active substances, foam stabilizers, cell regulators, fillers, dyes, pigments, flame retardants, antistatics, hydrolysis inhibitors and/or fungistatic and bacteriostatic substances.

The invention further provides an insulated pipe made up of
i) an inner pipe which serves for transport of a medium, also referred to as pipe for a medium,
ii) a layer of insulation material comprising the rigid polyurethane foam of the invention and
iii) an outer pipe within which the tube for a medium is located, preferably concentrically.

The pipe (i) for a medium is generally a steel pipe having an external diameter of 1 cm to 120 cm, preferably from 4 cm to 110 cm, and a length of from 1 m to 24 m, preferably from 6 m to 16 m.

A layer of insulating material (ii) comprising the rigid polyurethane foam of the invention is arranged on the outside of the pipe for a medium. This layer generally has a thickness of from 1 cm to 20 cm, preferably from 2 cm to 15 cm.

In a preferred embodiment, the layer of insulation material has an overall foam density of less than 110 kg/m$^3$, preferably from 50 kg/m$^3$ to 100 kg/m$^3$, particularly preferably from 60 kg/m$^3$ to 90 kg/m$^3$. Here, the overall foam density is the foam density distribution over the cross section of the pipe and the length of the pipe.

In a further preferred embodiment, the layer of insulation material (ii) comprising the polyurethane foam of the invention has a thermal conductivity of less than 28 mW/mK, preferably from 22 mW/mK to 27 mW/mK, particularly preferably from 22 mW/mK to 26.5 mW/mK, measured in accordance with EN ISO 8497 at an average temperature of 50° C.

The outer pipe (iii) surrounds the layer of insulation material and generally comprises plastic, preferably polyethylene, and usually has a wall thickness of from 1 mm to 30 mm, preferably from 5 mm to 30 mm. The internal diameter of the outer pipe (iii) is preferably from 6 cm to 140 cm, particularly preferably from 10 cm to 120 cm.

The outer pipe (iii) can optionally comprise a plurality of layers which are assembled during the extrusion operation. An example is the introduction of multilayer films between rigid polyurethane foam and outer pipe, with the film comprising at least one metallic layer to improve the barrier action.

Suitable outer pipes of this type are described in EP-A-960 723.

In a particularly preferred embodiment, the insulated pipe is an insulated composite outer pipe for district heating networks laid in the ground, which meets the requirements of DIN EN 253.

Finally, the invention provides a process for producing insulated hollow bodies, preferably insulated pipes, which comprises the steps:

1) production of a hollow body, preferably a pipe for a medium and an outer pipe, with the pipe for a medium being arranged within the outer pipe in such a way that a preferably uniformly wide annular gap is formed in all places, preferably by means of spacers,
2) introduction of the mixture comprising rigid polyurethane foam constituents and starting materials for producing a polyurethane matrix into the hollow space, preferably the annular gap between pipe for a medium and outer pipe,
3) curing of the polyurethane matrix.

In a preferred embodiment, insulated pipes are produced by means of the batchwise pipe-in-pipe production method. In this process, the inner pipe, which is preferably made of steel, is pushed, preferably concentrically into an outer pipe which is referred to as sheathing pipe, so that an annular gap is formed between the two pipes. Spacers which serve to center the inner pipe are preferably present between the inner pipe, also referred to as pipe for a medium, and the sheathing pipe. In principle, any sheath which is stable over the production time and serves to shape the rigid polyurethane foam is suitable as sheathing pipe. The sheathing pipe is, in a preferred embodiment, made of polyethylene or folded spiral-seam metal sheet.

In a further preferred embodiment, the inner pipe is laid in a reusable pipe mold which comprises two or more segments and allows the reaction mixture to react fully in a tubular shape. A sheathing pipe is subsequently applied on top of the PUR foam by means of extrusion. This process has the advantage that the number of spacers may be able to be reduced or such spacers may be able to be dispensed with entirely.

The unit comprising inner pipe for a medium and outer sheathing pipe is also referred to as double pipe having an intermediate annular gap. The annular gap is filled with the mixture comprising rigid polyurethane foam constituents and a reaction mixture. For the filling operation, the double pipe is provided with end caps (9) which close up the annular gap in both directions and are provided with venting holes so that gas can escape from the annular gap during filling and curing operations.

The double pipe is preferably filled with the mixture on a slightly inclined foaming table (6), with the pipe preferably being inclined at an angle of from 1° to 10°, more preferably from 1.5° to 7°. The double pipe is preferably provided with end caps (9) so that the mixture can spread out only in the annular gap.

The liquid mixture is introduced into the annular gap by means of a polyurethane metering machine (4) and fills the annular gap while still in liquid form and then cures.

In another preferred embodiment, the mixture is strongly compressed in the hollow space so that the end caps (9) would be pushed away without clamps (7). Without the seal 8, material would be squeezed out between pipe (1) for a medium and end cap (9). The venting holes of the end caps are closed by means of stoppers or automatic valves when foam begins to come out.

In the process for producing insulated hollow spaces, preferably insulated pipes, the use of the mixture according to the invention leads to the following advantages: Simplified and/or quicker production of relatively large hollow spaces, preferably relative long pipe segments, reduced overall foam density in the hollow body, better foam density distribution, lower thermal conductivity, increased productivity due to shorter curing times. The insulated hollow spaces produced therefrom have corresponding advantages.

The invention further provides for the use of rigid foam constituents and/or reaction mixture which has not been fully cured having the above-described properties for producing rigid polyurethane foam comprising previously produced rigid foam constituents.

All embodiments described in the application count as disclosed in each case with every other embodiment even when for reasons of simplicity not every individual combination of one embodiment with every other embodiment has been formulated.

The invention claimed is:

1. A rigid polyurethane foam, comprising:
   rigid polyurethane foam constituents; and
   a polyurethane matrix;
   wherein
   the rigid polyurethane foam constituents are embedded in the polyurethane matrix, and
   an average cell diameter of the rigid polyurethane foam constituents is from 0.1 mm to 0.5 mm.

2. The rigid polyurethane foam according to claim 1, wherein the density of the rigid polyurethane foam constituents is from 20 kg/m$^3$ to 200 kg/m$^3$.

3. The rigid polyurethane foam according to claim 1, wherein the density of the rigid polyurethane foam constituents is from 30 kg/m$^3$ to 80 kg/m$^3$.

4. The rigid polyurethane foam according to claim 1, wherein the density of the rigid polyurethane foam constituents is from 30 kg/m$^3$ to 70 kg/m$^3$.

5. The rigid polyurethane foam according to claim 1, wherein the foam cells in the rigid polyurethane foam constituents have an average cell diameter in the range from 0.11 mm to 0.3 mm.

6. The rigid polyurethane foam according to claim 1, wherein the foam cells in the rigid polyurethane foam constituents have an average cell diameter in the range from 0.12 mm to 0.2 mm.

7. The rigid polyurethane foam according to claim 1, wherein the foam cells in the rigid polyurethane foam constituents have an average cell diameter in the range from 0.12 mm to 0.18 mm.

8. The rigid polyurethane foam according to claim 1, wherein the foam cells in the polyurethane foam constituents have a maximum dimension of from 0.1 cm to 0.8 cm.

9. The rigid polyurethane foam according to claim 1, wherein the polyurethane foam constituents have a maximum dimension of from 0.1 cm to 0.5 cm.

10. The rigid polyurethane foam according to claim 1, wherein the density of the rigid polyurethane foam constituents is in the range from 10 kg/m$^3$ to 400 kg/m$^2$.

11. The rigid polyurethane foam according to claim 1 or 10, wherein the foam cells in the rigid polyurethane foam constituents have a smaller cell diameter than the polyurethane matrix.

12. The rigid polyurethane foam according to claim 1 or 10, wherein the polyurethane foam constituents have a maximum dimension of from 0.06 cm to 1 cm.

13. An article enveloped by a foam according to claim 1 or 10 for thermal insulation.

14. The article according to claim 13, wherein the article is a pipe for the transport of liquids or gases.

15. The pipe according to claim 14, wherein the pipe has an external diameter in the range from 170 cm to 8 cm.

16. A process for producing a rigid foam, comprising:
   preparing a mixture of previously produced rigid foam constituents and a reaction mixture comprising an isocyanate component (a2) and at least one compound (b2) having at least two hydrogen atoms reactive toward isocyanate; and
   curing the mixture to obtain the rigid polyurethane foam having rigid foam constituents within a rigid foam matrix;
   wherein
   an average cell diameter of the rigid polyurethane foam constituents is from 0.1 mm to 0.5 mm, and
   the mixture optionally further comprises at least one catalyst and/or at least one chemical blowing agent.

17. The process according to claim 16, wherein the at least one compound (b2) having at least two hydrogen atoms which are reactive toward isocyanate is a polyol and the reaction mixture has a viscosity at 20° C. in the range from 0.4 Pa*s to 1.0 Pa*s.

18. The process according to claim 16, wherein the reaction mixture has a viscosity at 20° C. in the range from 0.3 Pa*s to 1.5 Pa*s.

19. The process according to claim 16 or 18, further comprising:
   introducing the mixture into a mold.

20. The process according to claim 19, wherein the mold is a hollow space formed by two pipes which are located concentrically with one another and whose ends are provided with a cap.

* * * * *